O. S. SCHAIRER.
GEAR SHIFTING MECHANISM.
APPLICATION FILED DEC. 26, 1913.

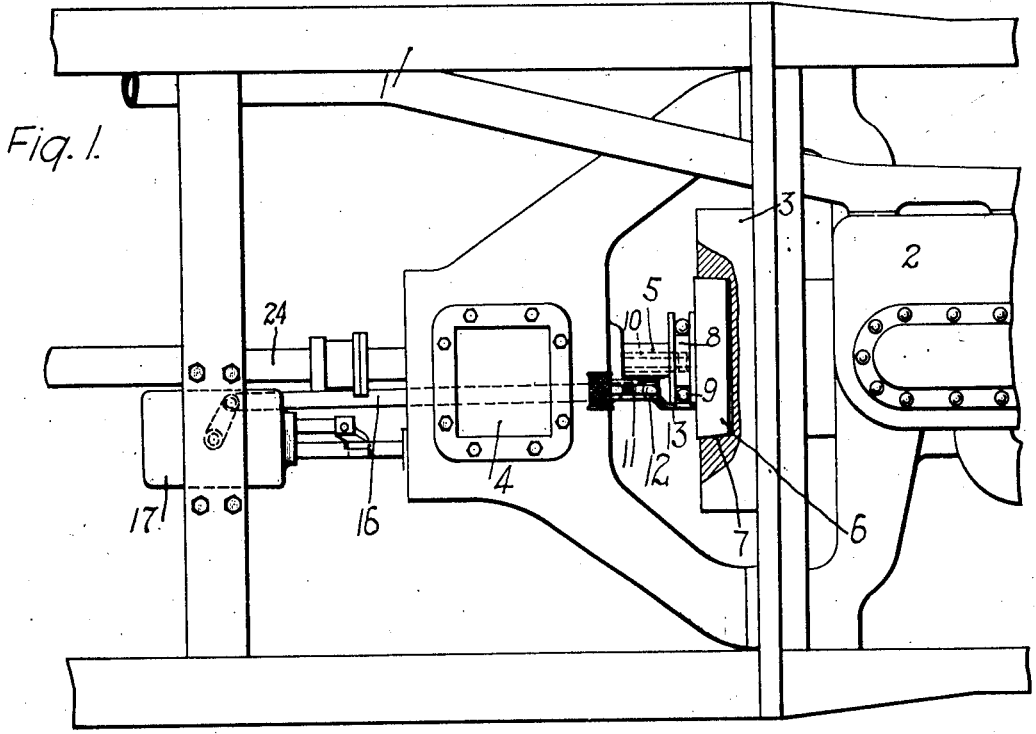
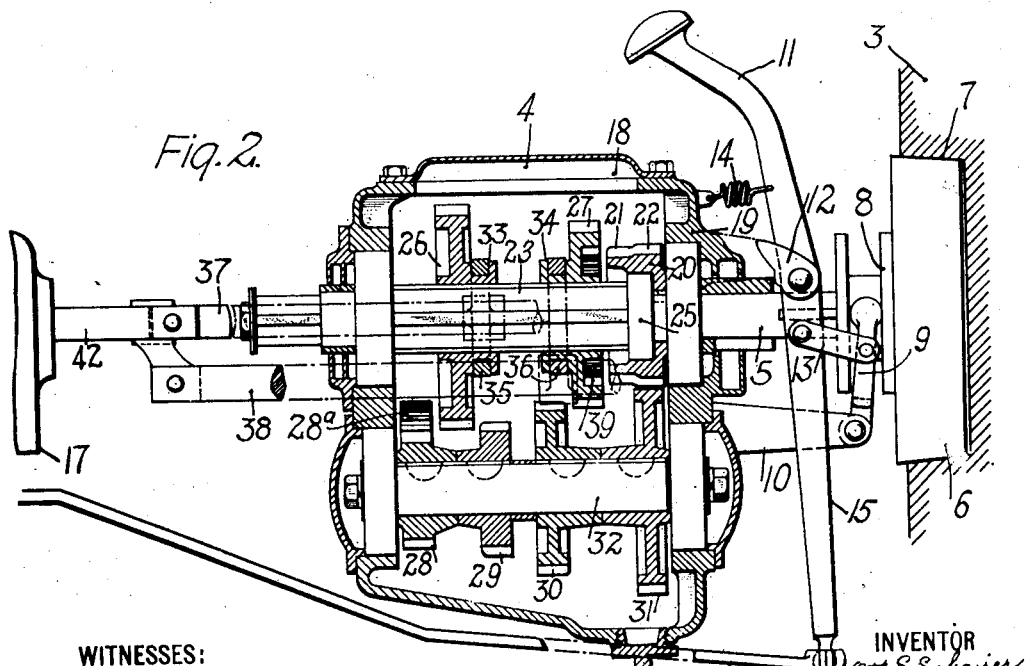

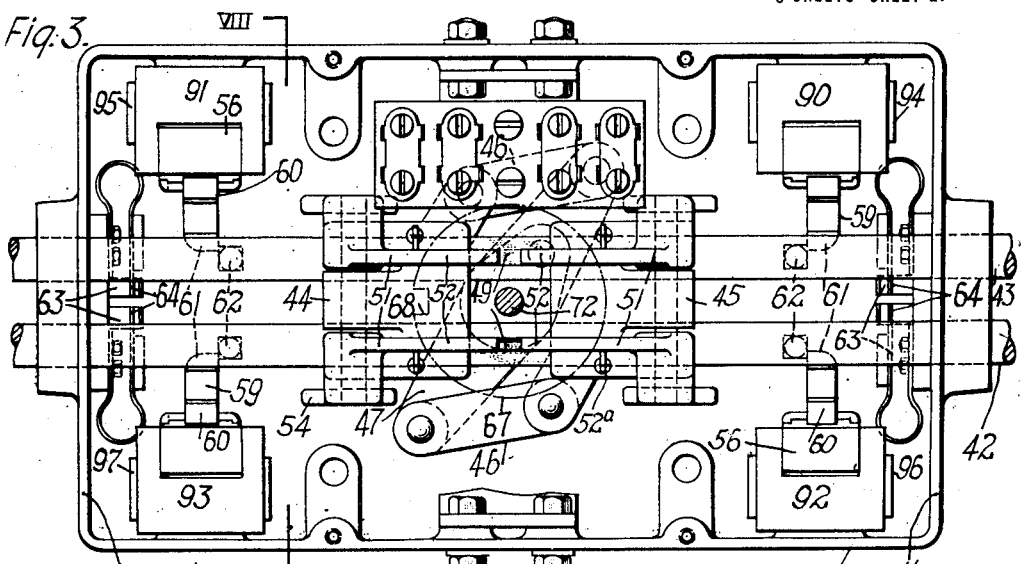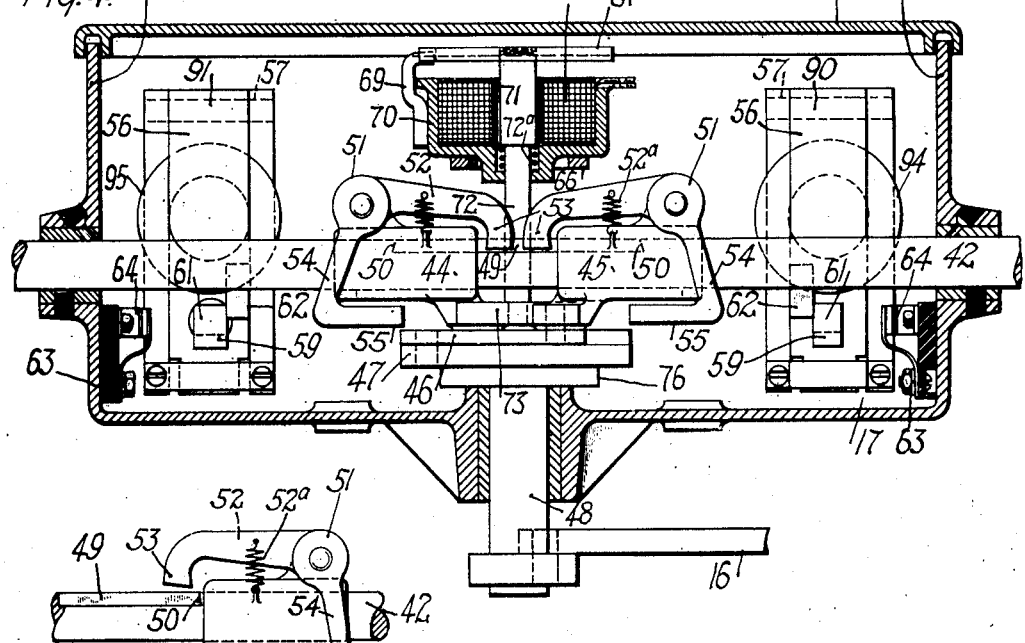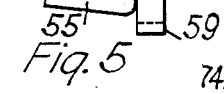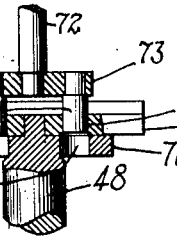

1,363,674.

Patented Dec. 28, 1920.
3 SHEETS—SHEET 3.

WITNESSES:

INVENTOR
Otto S. Schairer
BY
ATTORNEY

UNITED STATES PATENT OFFICE.

OTTO S. SCHAIRER, OF EDGEWOOD PARK, PENNSYLVANIA, ASSIGNOR TO WESTING-HOUSE ELECTRIC AND MANUFACTURING COMPANY, A CORPORATION OF PENNSYLVANIA.

GEAR-SHIFTING MECHANISM.

1,363,674.  Specification of Letters Patent.  Patented Dec. 28, 1920.

Application filed December 26, 1913. Serial No. 808,735.

*To all whom it may concern:*

Be it known that I, OTTO S. SCHAIRER, a citizen of the United States, and a resident of Edgewood Park, in the county of Allegheny and State of Pennsylvania, have invented a new and useful Improvement in Gear-Shifting Mechanism, of which the following is a specification.

My invention relates to gear shifting mechanism for automobiles and other vehicles or devices, and it relates particularly to mechanism of the kind in which the selection of the gears to be meshed is effected by means of a suitable controller upon the steering post, or otherwise conveniently located, and the meshing or shifting of the gears is caused or effected by depressing the clutch pedal beyond its clutch-disengaging position or by any other suitable means.

One object of my invention is to provide a mechanism of this character that shall be simple in construction and reliable in operation, and in which the selection of the gears may be effected in advance of the shifting operation.

A further object is to so construct and arrange the parts of the device that, when selective solenoids are employed, they may be stationary, thus avoiding the necessity of employing flexible connections to them.

It has heretofore been proposed to dispense with the manually operated lever that is usually employed for shifting the gears in a speed-changing transmission, and to substitute therefor a conveniently located set of buttons or other controller for governing the circuits of solenoids that effect the shifting of the gears. In a device of this character, it is necessary that the solenoids shall be large, in order to be sufficiently powerful to directly shift the gears, with the result that the device is relatively heavy and expensive and requires considerable battery capacity for its effective operation.

In the device of the present invention, solenoids may be employed for the purpose of selecting the gears to be shifted, but the shifting itself is effected by the driver of the vehicle, as, for instance, by depressing the clutch pedal beyond clutch-releasing or disengaging position. The shifting apparatus is therefore light, compact and inexpensive, and such solenoids as may be employed are stationary, so that no flexible leads are employed and the wiring to them may be substantial, reliable and permanent.

Figure 7:
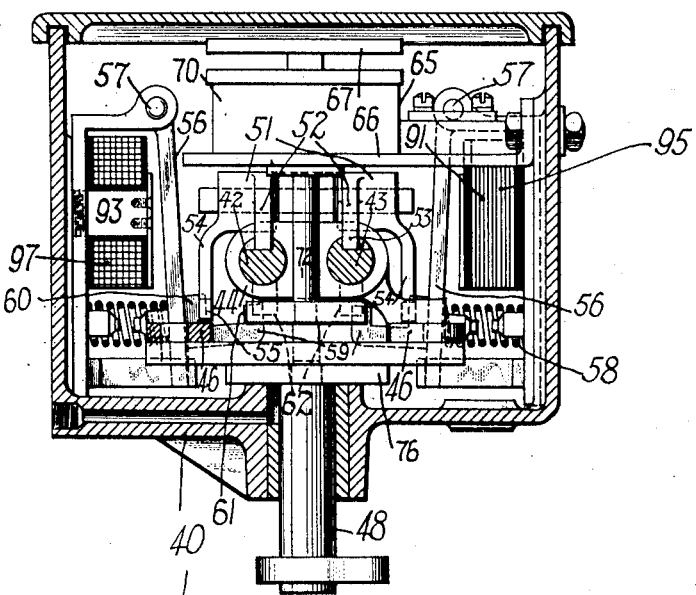
Figure 8:
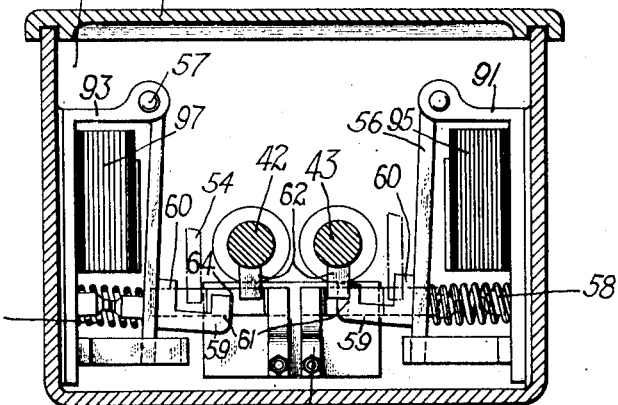
Figure 9:
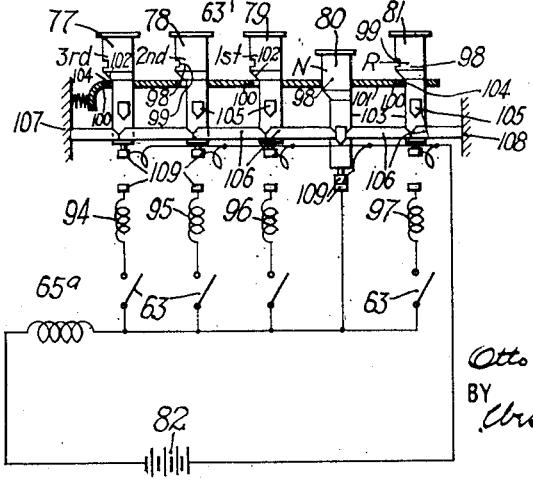

In the accompanying drawings, Figure 1 is a view, partially in plan and partially in section, of a portion of an automobile with my invention attached thereto. Fig. 2 is a view, partially in elevation and partially in section, of the transmission mechanism of an automobile and its related parts. Fig. 3 is a plan view of the gear shifting mechanism. Fig. 4 is a view in longitudinal section of the mechanism of Fig. 3. Figs. 5 and 6 are views of details. Fig. 7 is a sectional view of the mechanism of Fig. 3. Fig. 8 is a view in section on line VIII—VIII of Fig. 3. Fig. 9 is a diagrammatic view of the electrical circuits employed in connection with my invention and of the mechanism for controlling a set of push buttons that control the circuits.

Referring particularly to Figs. 1 and 2, an automobile chassis 1, only a portion of which is shown, is provided with a gas engine 2 having a fly wheel 3. A transmission mechanism or change-speed gear mechanism 4 is connected to the engine 2 by a shaft 5 and a conical clutch member 6 that is slidably mounted on the shaft 5 to coact with a correspondingly shaped clutch member 7 that is integral with the fly wheel 3. The clutch member 6 is provided with an integral grooved collar 8 to be engaged by a yoke member 9 that has a pivotal support upon a bracket 10. A pedal 11, that is adapted to be operated by the foot of the operator, has a pivotal support upon a lug 12 and is connected by a link 13 to the yoke member 9. A spring 14, that is attached at one end to a suitable stationary part, normally retains the clutch pedal 11 in its rearward position with the clutch member 6 engaging the fly wheel 3. The clutch pedal 11 is provided with an extended portion 15 that is connected by a link 16 to a gear shifting mechanism indicated broadly at 17.

The transmission mechanism 4 forms no part of my invention but is combined therewith, so that a description thereof is, accordingly, desirable in order to explain the operation of the gear shifting mechanism. The shaft 5, which is connected to the engine clutch 6, extends into the transmission casing 18 through an end wall 19 of the casing and has a bearing therein. A gear wheel 20, having two sets of gear teeth 21 and 22, is mounted upon the shaft 5 within the casing 18. A transmission shaft 23, which is connected to the main transmission shaft 24, is in axial alinement with the shaft 5 and has a bearing at 25 within the gear wheel 20. The shaft 23 is adapted to be connected to the shaft 5 at different speed ratios by means of two gear wheels 26 and 27 that are slidably keyed upon the shaft 23, gear wheels 28, 29, 30 and 31 that are fixed upon a counter shaft 32 and an idler gear wheel 28ª that is in mesh with the gear wheel 28.

The gear wheel 31 is always in mesh with the gear teeth 22 to establish a fixed speed ratio between the shafts 5 and 32. The mechanism is arranged to provide three speeds in the forward and one in the reverse direction. The changes in speed ratio are controlled by the slidable gear wheels 26 and 27 which are respectively provided with integral grooved collars 33 and 34 to be engaged by yoke members 35 and 36. The yoke members 35 and 36 are respectively fixed upon shift rods 37 and 38 that are controlled by the gear shifting mechanism, as will be later described.

When the gear wheel 26 is in mesh with the gear wheel 29, the mechanism is in its first or low-speed position and the shaft 5 is connected through the gear teeth 22, gear wheel 31, counter shaft 32 and gear wheels 29 and 26 to the transmission shaft 23. For the second or intermediate speed, the gear wheel 27 is shifted into mesh with the gear wheel 30. For the third or high speed, the gear wheel 27 is shifted to the right until internal gear teeth 39, with which the gear wheel 27 is provided, mesh with the gear teeth 21. The shaft 5 is then directly connected to the transmission shaft 23 and the latter is driven at engine speed. For driving in the reverse direction, the gear wheel 26 is shifted into mesh with the idler gear wheel 28ª which is always in mesh with the gear wheel 28. The transmission mechanism is illustrated in its neutral or inoperative position in which the shaft 23 is not connected to the counter shaft 32.

Referring now to Figs. 3 to 8, inclusive, the gear shifting mechanism 17 comprises a housing or casing 40 having end walls 41 which provide a bearing for two shift rods 42 and 43. The shift rods 42 and 43, which are slidable axially in their bearings, are respectively connected to the shift rods 37 and 38 of the transmission mechanism. Two blocks 44 and 45 are slidably mounted upon the shift rods 42 and 43. The blocks 44 and 45 are connected by links 46 to the oppositely extending arms of a lever 47. The oscillation of the lever 47 operates to slide the blocks 44 and 45 in opposite directions simultaneously. A rock shaft 48, which is actuated by the link 16 simultaneously with the operation of the clutch member 6, is adapted to be connected to the lever 47 under certain conditions, as will be later described.

The shift rods 42 and 43 are each provided with a longitudinal groove 49 having inclined shoulder portions 50 at each end of it. Dogs 51, that are pivotally mounted on opposite sides of the blocks 44 and 45, are provided with horizontally extending arms 52 having hook portions 53. Normally, the arms 52 are retained by springs 52ª in the position shown in Fig. 4, with the hook portions 53 resting upon the bottom of the grooves 49 in position to engage the shoulder portions 50. The dogs 51 are also provided with arms 54 that extend substantially vertically and are each provided with a horizontally extending portion 55.

Four stationary solenoids, or electromagnets of the clapper type, 90, 91, 92 and 93 are attached to the side walls of the housing 40, each of the solenoids being adjacent one of the corners of the housing. The solenoids comprise coils 94, 95, 96 and 97, respectively. Each solenoid comprises, also, an armature 56 having a pivotal support indicated at 57 and normally held outward by a spring 58. Each armature 56 is provided, upon its outer face, with a stop 59 of substantially U-shape. When the solenoids are deënergized, the vertical portions 60 of the corresponding stops 59 are in the paths of movement of the arms 54 of the coacting dogs 51, and the vertical portions 61 of the said stops are in the paths of movement of lugs 62.

The lugs 62, which are four in number, are located on the under sides of the shift rods 42 and 43, there being one on each rod upon each side of the blocks 44 and 45. When the blocks 44 and 45 are moved outwardly, and the arms 54 are engaged by the respective stops 59, the dogs 51 are rocked on their pivots and the arms 52 are raised upwardly from the grooves 49 so that the hook portions 53 cannot engage the shoulder portions 50. When one of the lugs 62 engages the corresponding stop 59, further movement of the corresponding shift rod in that direction is prevented.

When the solenoids are energized, the armatures are drawn inwardly and the stops 59 do not obstruct the outward movements of the several arms 54 and the lugs 62. The arms 54 then pass between the vertical portions 60 and 61 of the stops 59, the horizontal portions 55 of the arms being of sufficient length to retain the armatures in this position until the arms 54 are withdrawn. In the operation of the mechanism, which is later described, it is possible to energize only one of the solenoids at one time. Consequently, if one of the solenoids be energized, all of the arms 52 except that one corresponding to the energized solenoid will be raised to prevent the respective hook portions 53 from engaging the shoulder portions 50 with which they coact. The arm 52 that is not raised will engage its coacting shoulder portion 50 and a further movement of the sliding blocks 44 and 45 will cause a shifting of the rod 42 or 43, as the case may be, to shift one or the other of the slidable gear wheels 26 and 27 in the same direction. Each of four self-closing limit switches 63, which are mounted in pairs in each end of the casing 40, comprises a movable member 64 which is actuated by one of the lugs 62 when the corresponding shift rod has reached the limit of its endwise movement. Each limit switch 63 controls the circuit of one of the solenoids, the arrangement being such that the circuit of the solenoid that has been energized to cause the shifting of one of the rods 42 and 43, when the blocks 44 and 45 are moved apart, is always broken by the corresponding limit switch that is opened at the end of the movement of the said rod which causes meshing of the transmission gear wheels.

The connection of the rock shaft 48 to the lever 47 is controlled by a mechanism comprising a solenoid 65 that is supported by a bracket 66 attached to the side walls of the housing 40. The solenoid 65 is provided with an armature 67 having the form of a disk and having a notch 68 in its periphery to coact with a curved stationary member 69 attached to the solenoid casing 70. The armature 67 is attached to a movable core member 71 having a rod 72 integral therewith. A spring 72ª normally holds the armature 67, the core member 71 and the rod 72 in their respective upper positions. A collar member 73, which is attached to the rod 72 at its lower extremity, is provided with pins 74 which project into corresponding holes 75 in the lever 47. The rock shaft 48 is provided with a fixed collar 76 having holes 76ª which register with the pins 74 and the holes 75 only when the clutch member 6 is disconnected. The pins 74 project into the holes 76ª to connect the lever 47 and the shaft 48 when the solenoid 65 is energized and the corresponding parts are in register.

The notch 68 of the disk 67 registers with the stationary member 69 only when the several blocks 44 and 45 and dogs 51, that are connected by the lever 47 to the rod 72, are in their normal or neutral positions, as illustrated in Figs. 3 and 4. Consequently, if these parts are not in their normal positions, the armature 67 is held downward by the stationary member 69, and the pins 74 are held within the holes 76 until the various parts are in their respective normal or neutral positions, regardless of the deënergizing of the coil 65ª.

The electrical circuits for controlling the gear shifting mechanism are illustrated in Fig. 9. The electrical connections comprise five parallel circuits which are respectively controlled by push buttons 77, 78, 79, 80 and 81. The several push buttons are designated according to the speed ratio controlled by them as 3rd, 2nd, 1st, N (neutral), and R (reverse), respectively. The push buttons 77, 78, 79 and 81 are so interlocked that only one button can be actuated at one time and this one remains closed until another button has been actuated. The button 80, or neutral button, is arranged to open as soon as released after actuation. The solenoid coils 94, 95, 96 and 97 are in series with the push buttons 77, 78, 79 and 81, respectively, and with the corresponding limit switches 63. The winding 65ª of the solenoid 65 is in series with each of the parallel circuits and with a battery 82.

The means employed to interlock the push buttons forms no part of the present invention, but a brief description of the same is desirable in order to explain the operation of my invention. Each push button, except the neutral button 80, is provided with a head portion 98 having a notch or groove 99 to be engaged by coacting portions 100 of a spring pressed slidable member 101 when the button has been depressed to bring the groove 99 into register with the portions 100. The several push buttons comprise inclined portions 102 and reduced portions 103 which project downwardly through slots 104 in the member 101, and are provided with lugs or bosses 105. The lugs 105 are wedge shaped at one end to be inserted between the ends of bars 106 that are slidably mounted between two suitable stationary parts 107 and 108. The distance between the stationary parts 107 and 108 is equal to the sum of the lengths of the several bars 106 and the width of one of the lugs 105, thereby insuring that only one of the push buttons may be fully depressed at one time. When one of the buttons is depressed, the lug 105 is inserted between the ends of the corresponding bars 106 and the groove 99 is engaged by the coacting portion 100 to lock it in its depressed position, with the corresponding contact members 109 engaged. When it is desired to close a second circuit, the corresponding button is pressed, and the inclined portion 102 engages the locking portion 100 to slide the member 101 to the left and thereby release the first push button before the lug 105 has engaged the corresponding bars 106. The neutral button 80, which is not provided with a groove 99, operates to release any other button which may have been locked in position to close its corresponding circuit.

It may be assumed that the transmission gear mechanism is in its neutral position, as illustrated in Fig. 2, and that the gear shifting mechanism is in its corresponding normal or neutral position, as shown in Figs. 3 and 4. It may be assumed, also, that the engine has been started and that the engine clutch 6 is disengaged. It is desirable to start the vehicle on first speed, and the push button 79 is accordingly pressed to close a circuit from the battery through the push button 79, coil 96 of the solenoid 92, limit switch 63 and solenoid coil 65ª to the battery. The coil 96 is energized to draw the armature 56 of the solenoid 92 inwardly so that it cannot obstruct the movement of the corresponding dog 51 and lug 62. The coil 65ª of the solenoid 65 is also energized to draw the armature 67, core member 71 and rod 72 downwardly to insert the pins 74 into the holes 76ª and thereby connect the rock shaft 48 to the lever 47 when the several corresponding parts are in register. The clutch pedal 11, which, at the time of starting the engine, is in such a position that the engine clutch 6 is disengaged or out, is then pressed forwardly beyond this position. The link 16 then rotates the rock shaft 48 by means of a crank arm 82, and the lever 47 is thus operated to actuate the blocks 44 and 45 outwardly, the hook portions 53 of the arms 52 sliding along the grooves 49. When the hook portions 53 approach the shoulders 50, the arms 54, with the exception of that one coacting with the solenoid 92, engage the corresponding stops 59, and the dogs 51 are rocked about their pivots to raise the arms 52 from the grooves 49. Further movement of the blocks causes the dog 51 that is not rocked to engage the rod 42 and move it to the right (Figs. 3 and 4) to mesh the gear wheel 26 with the gear wheel 29.

When the gear wheels 26 and 29 are fully meshed, the lug 62 will have opened the corresponding limit switch 63 to break the circuit comprising the coil 96 and the coil 65ª. The operator then allows the spring 14 to retract the clutch pedal 11. The blocks 44 and 45 are then moved toward each other and the several dogs 51 are returned to their respective normal positions, the springs 52ª drawing the arms 52 downwardly as soon as the hook portions 53 have passed the shoulders 50. The notch 68 of the disk 67 then registers with the stationary member 69, and the spring 72ª moves the rod 72 and the pins 74 upwardly to disconnect the rock shaft 48 from the lever 47. The engine clutch is still out when the various parts are in their respective normal or neutral positions. Further return movement of the clutch pedal will effect the engagement of the engine clutch and the vehicle will be driven through the connections above described.

The circuit controlled by the push button 79 will remain open until another button has been pressed and the gears shifted from the first speed position. The limit switch 63 will remain open until the shift rod 42 has been returned to withdraw the lug 62 from engagement with the switch member 64. The coil 65ª cannot be energized until a push button other than 79 is pressed. It is, therefore, impossible to connect the lever 47 of the shifting mechanism to the clutch pedal 11 before a second button has been actuated. The clutch can be controlled as desired without in any way affecting the transmission gear mechanism.

When it is desired to change the speed ratio, as, for example, to second speed, the push button 78 may be pressed at any time desired in advance of the actual change. The coil 95 of the solenoid 91 and the coil 65ª will be energized to perform the same functions as described in connection with the corresponding parts when the push button 79 was closed. To effect the change to the desired speed, the operator presses the pedal 11 to disengage the engine clutch. The pins 74 connect the rock shaft 48 to the lever 47 at substantially the time of disengagement of the clutch. The rod 42 is in its shifted position and the shoulder 50 at the left end of the groove 49 is near the coacting hook portion 53 of the adjacent arm 52 so that a slight outward movement of the latter member will cause these parts to engage. The further actuation of the pedal 11 after the clutch is out, therefore, first operates to shift the rod 42 to its neutral position. At this point, all of the dogs 51 except that one controlled by the solenoid 91 have engaged their corresponding coacting stops 59 and the arms 52 are rocked out of engagement with the respective shoulders 50. But, since the coil 95 of the solenoid 91 is energized, the coacting dog 51 is still in operative position, and the further movement of the clutch pedal 11 causes the rod 43 to be shifted to the left and the gear wheel 27 to be shifted into mesh with the gear wheel 30. The coacting limit switch 63 will then be opened and the coils 95 and 65ª deënergized. The release of the pedal 11 first causes the blocks 44 and 45 and the dogs 51 to be returned to their respective normal positions, whereupon the pins 74 are withdrawn. The further movement of the pedal by the spring 14 effects the engagement of the engine clutch, and the vehicle will be driven at second speed. In the same manner, changes may be made to third speed or the direction of drive reversed by actuating the appropriate push buttons 77 and 81, respectively. It will, of course, be understood that, in order to reverse the direction of the vehicle, it is necessary to bring it to a stop before the clutch is thrown in.

When it is desired to return either of the shiftable gear wheels 26 and 27 to the neutral position, the neutral button 80 is closed to energize the coil 65ª. This action may occur regardless of the closure of any of the speed-controlling buttons 77, 78, 79 and 81. The clutch is disengaged as before, whereupon the lever 47 is actuated by the rock shaft 48 to shift the blocks 44 and 45 outwardly. The shifted rod is in a position to be engaged immediately by the appropriate dog 51 to return it to its normal or neutral position. When the dogs 51 reach the stops 59, all of the arms 52 are rocked out of the grooves 49, since none of the controlling solenoids 90, 91, 92 and 93 are energized. It is then impossible to shift the gear wheels until one of the buttons, other than the neutral button 80, is closed.

It will be noted that I have provided a device which operates to effect any desired speed ratio between the engine and the driving wheels of a vehicle. The operator may anticipate any desired change of speed ratio by pressing the appropriate button at any time in advance of the actual change, because the shifting of the gears will occur only upon the actuation of the clutch pedal beyond its normal disengaging position. When the buttons are open, the operation of the clutch pedal can have no effect upon the position of the shiftable gear wheels. The change of speed ratio may be effected with a small effort on the part of the operator, and it does not require that his attention be diverted from the steering of the vehicle. These and many other advantages will be apparent to those skilled in the art to which my invention appertains.

While I have illustrated and described a gear shifting system in which the selection is effected electrically, my invention may be utilized in connection with apparatus in which the selective function is effected by other and widely different means, as will be understood by those skilled in the art.

I claim as my invention:

1. In a gear shifting mechanism, the combination with a shift rod, and two members movable longitudinally of the rod in opposite directions, of means carried by the said members for connecting them to the shift rod, and means for selectively controlling the said connecting means.

2. In a gear shifting mechanism, the combination with a shift rod, and two members movable longitudinally of the rod in opposite directions, of means carried by the said members for connecting them to the shift rod, and electrical means for selectively controlling the said connecting means.

3. In a gear shifting mechanism, the combination with a shift rod, and two members movable longitudinally of the rod in opposite directions, of means carried by the said members for connecting them to the shift rod, and stationary solenoids for selectively controlling the said connecting means.

4. In a gear shifting mechanism, the combination with a shift rod, and two members movable longitudinally of the rod in opposite directions, of means for connecting the said members to the shift rod, means for preventing the connection of the said parts, and means for selectively controlling the said preventive means.

5. In a gear shifting mechanism, the combination with a shift rod, and two members movable longitudinally of the rod in opposite directions, of means for connecting the said members to the shift rod, means for preventing the connection of the said parts, and electrical means for selectively controlling the said preventing means.

6. In a gear shifting mechanism, the combination with a shift rod, and two members movable longitudinally of the rod in opposite directions, of means carried by the said members for connecting the members to the shift rod, stops that prevent the connection of the said parts, and means for selectively withdrawing said stops.

7. In a gear shifting mechanism, the combination with a shift rod, and two members movable longitudinally of the rod in opposite directions, of means carried by the said members for connecting the members to the shift rod, stops that prevent the connection of the said parts, and electrical means for selectively withdrawing said stops.

8. In a gear shifting mechanism, the combination with a shift rod, and two members movable longitudinally of the rod in opposite directions, of means carried by the said members for connecting the members to the shift rod, stops that prevent the connection of the said parts, electromagnets for withdrawing said stops, and means for selectively controlling the circuits of the electromagnets.

9. In a gear shifting mechanism, the combination with a stationary part, a shift member, and two members movable relatively to the shift member in opposite directions, of means for connecting the latter members to the shift member, means for preventing the connection of said members, and means carried by the stationary part for selectively controlling the said preventing means.

10. In a gear shifting mechanism, the combination with a plurality of shiftable members, and a plurality of members that are movable relatively thereto, of a plurality of pivotally mounted levers for connecting said movable members to said shiftable members, and means comprising stationary solenoids for controlling said levers.

11. In a gear shifting mechanism, the combination with a plurality of shiftable members, a plurality of movable members, a plurality of pivotally mounted levers for connecting said movable members to said shiftable members, means for controlling the operation of each of said levers, said means comprising an obstructing member and electromagnetic means for controlling said obstructing member.

In testimony whereof I have hereunto subscribed my name this 19th day of Dec., 1913.

OTTO S. SCHAIRER.

Witnesses:
M. C. MERZ,
B. B. HINES.